United States Patent [19]

Funamoto

[11] Patent Number: 5,587,986
[45] Date of Patent: Dec. 24, 1996

[54] ON-TRACK DETECTING CIRCUIT FOR USE IN TRACKING SERVO APPARATUS

[75] Inventor: Kyota Funamoto, Tokorozawa, Japan

[73] Assignee: Pioneer Electronic Corporation, Tokyo, Japan

[21] Appl. No.: 540,402

[22] Filed: Oct. 6, 1995

[30] Foreign Application Priority Data

Oct. 14, 1994 [JP] Japan .................................. 6-276140

[51] Int. Cl.⁶ ........................................................ G11B 7/00
[52] U.S. Cl. ........................ 369/124; 369/44.34; 369/32
[58] Field of Search .................................. 369/32, 44.25, 369/44.32, 44.34, 44.13, 124

[56] References Cited

U.S. PATENT DOCUMENTS

| 5,197,058 | 3/1993 | Bell, Jr. et al. | 369/44.34 |
| 5,504,727 | 4/1996 | Waehi | 369/124 |
| 5,513,161 | 4/1996 | Hosimai et al. | 369/124 |

*Primary Examiner*—Nabil Hindi
*Attorney, Agent, or Firm*—Keck, Mahin & Cate

[57] ABSTRACT

An on-track detecting apparatus which can accurately detect an on-track state of a disk even in a high speed search in an optical disk apparatus for recording or reproducing data to/from an optical disk having byte patterns of a sample servo. In an on-track detecting circuit in a tracking servo apparatus, a comparator for comparing a mean value of wobble pit signals and a clock pit signal is provided and an on-track signal is generated on the basis of a comparison result of the comparator.

3 Claims, 5 Drawing Sheets

ON-TRACK DETECTING CIRCUIT FOR USE IN TRACKING SERVO APPARATUS

BACKGROUND OF THE INVENTION

1. Field of the Invention

The present invention relates to an on-track detecting circuit for use in a tracking servo apparatus which is used in an optical disk apparatus.

2. Description of Background Information

FIG. 1 generally shows the relationship between pits formed on an optical disk and an output signal obtained by optically reading the pits. In FIG. 1, a portion (a) shows servo byte patterns for a sampled servo in an optical disk apparatus. Each sector of an optical disk consists of, for example, 43 servo blocks. One servo block is constituted by servo bytes of two bytes and subsequent data bytes of 16 bytes. The servo bytes are constructed by: two wobble pits of a third or fourth channel bit and an eighth channel bit of the first byte; and one clock pit of a twelfth channel bit of the second byte. The wobble pits are arranged on the right and left sides of the track center. When a pickup (light spot for information detection) traces the track center, reduction amounts of light amounts in the right and left wobble pits are equalized. When the trace position is deviated to the right or left from the track center, a tracking error signal is formed from a difference (level difference of an RF signal shown by a portion (c) in FIG. 1) between the light amounts in the two wobble pits in correspondence to the direction and amount of the deviation. The tracking error signal is held for an interval of the subsequent data bytes.

Since the former wobble pit is alternately arranged for the third or fourth channel bit every 16 tracks, an interval between the two wobble pits is alternately changed to a longer interval and a shorter interval every 16 tracks. By detecting change in such interval, the number of tracks can be accurately counted (16-track counting) even at the time of a high speed searching.

A distance D between the wobble pit which is located further backward and the clock pit is set to a special length which doesn't appear in the data bytes, so that the distance D can be detected as a synchronization (sync) signal. Various timing signals are formed on the basis of the detected sync signal. A clock signal (a portion (d) in FIG. 1) is formed in correspondence to a detection signal of the clock pit. In mirror surface portion locating at the distance D, a focusing error signal is sampled and is held for an interval of the subsequent data bytes.

In the data byte interval subsequent to such a servo byte interval, data is recorded by pits, in the form of phase change, or by using a magnetooptic method.

Specifically speaking, as shown in FIG. 2, sample and hold (S/H) circuits 3, 4, and 5 for sampling and holding photodetection signals obtained at the timings of the 3-, 4-, and 8-channel clocks are respectively provided. In order to discriminate in which one of the 3- and 4-channels the pit exists, outputs of the sample and hold circuits are led to a comparator 13. An output of the comparator 13 is latched by a latch circuit 17 and the sample and hold output of the channel clock in which the pit exists is selected by a selector 18. A difference between a selection output of the selector 18 and the sample and hold output in the 8-channel clock is detected by a subtractor 19, thereby obtaining the tracking error signal.

In such a tracking servo, when a tracking servo loop is closed, a servo is applied so that the tracking error signal is equal to zero. The timing at which the tracking error signal is nearly equal to zero when opening the tracking servo loop, however, exists in two cases of the timings of "on track" and "between tracks". When the tracking servo loop is closed at a wrong timing, therefore, there occurs a possibility that a laser beam is not focused onto the track. An on-track detecting circuit for judging whether the tracking loop can be closed or not is consequently necessary.

As an on-track detecting method in the on-track detecting circuit, in the optical disk of the sample servo format, only the clock pit exits on the track at the timing of the 12-channel clock in the second servo byte in the servo block as mentioned above. Since an amplitude value of the clock pit is larger than that between the tracks, by comparing those amplitude values, it is possible to discriminate whether the clock pit is an on-track state or not. The amplitude value of the clock pit is sampled a plurality of times, accordingly, the maximum and minimum amplitude values are obtained and the half of the sum of those values is set to a slice level. When the above amplitude value is larger than the slice level, it is judged as an on-track position.

FIG. 3 shows a more detailed circuit obtained by forming a digital IC from the foregoing tracking error detecting circuit and the on-track detecting circuit. First, the tracking error detecting circuit will be described. After that, the on-track detecting circuit will be described.

Tracking error detecting circuit

In the diagram, an RF signal reproduced from the optical disk or the like is supplied to an A/D converting circuit 1 and is A/D converted. Clocks necessary for the A/D converting operation have been supplied to the A/D converting circuit 1. A digital signal generated from the A/D converting circuit 1 is transmitted to latch circuits 3A to 5A and 6. The latch circuits 3A to 5A correspond to the sample and hold circuits 3 to 5 shown in FIG. 2. A timing signal generating circuit 2 forms a predetermined timing signal synchronously with a trigger signal and the clock which are received and supplies to circuits and means. The timing signals corresponding to the third, fourth, and eighth channel bits of the first byte and the twelfth channel bit of the second byte mentioned above have been supplied to the latch circuits 3A to 5A and 6, respectively. The latch circuits 3A to 5A and 6, therefore, latch the digital signals at timings of the timing signals.

Outputs of the latch circuits 3A and 4A are supplied to the comparator 13. The comparator 13 outputs, for example, a signal of the high level when the output of the latch circuit 3A is larger than the output of the latch circuit 4A and outputs a signal of the low level when the output of the latch circuit 3 is smaller than the output of the latch circuit 4A. The output of the comparator 13 is supplied to a delay flip-flop 17A as a latch circuit, and is latched at a predetermined timing. As mentioned above, the first wobble pit is formed in the third or fourth channel bit. The flip-flop 17A, which corresponds to the latch circuit 17 shown in FIG. 2, therefore, outputs the signal of the high level for a period of time of 16 tracks during which the wobble pit is recorded in the third channel bit and the signal of the low level for a period of time of 16 tracks during which the wobble pit is recorded in the fourth channel bit. That is, by monitoring the output of the flip-flop 17A, 16 tracks can be counted.

The output of the flip-flop 17A is supplied to a selector 18. The selector 18 selects and generates the output of the latch circuit 3 when the signal of the high level is received and the output of the latch circuit 4 when the signal of the low level is received. By such operations, the output having the wobble pit in the outputs of the latch circuits 3A and 4A is selected by the selector 18 and is latched by a latch circuit 7. A timing signal similar to that of the latch circuit 5A has been supplied to the latch circuit 7. As mentioned above, a difference between the value latched by the latch circuit 5A and the value latched by the latch circuit 7 is calculated by a subtracting circuit 19. Since the latch circuits 5 and 7 latch the values in the two wobble pits, a digital tracking error signal is consequently formed by a subtracting circuit 19A which corresponds to the subtractor 19 shown in FIG. 2. The digital tracking error signal that is generated by the subtracting circuit 19 is latched by a latch circuit 8 at a predetermined timing.

An output of the latch circuit 8 is further supplied to a latch circuit 9 and is latched. Adding circuits 21 and 22 add predetermined reference values to an output of the latch circuit 9. A comparing circuit 14 compares the output of the latch circuit 8 and an output of the adding circuit 21. When the former output is larger than the latter one, the comparing circuit 14 generates, for example, a signal of the high level. A comparing circuit 15 similarily compares the output of the latch circuit 8 and an output of the adding circuit 22 and generates the signal of the high level when the former output is smaller than the latter one. That is, what is called a window comparator is constructed by the comparing circuits 14 and 15 and the adding circuits 21 and 22. When a logic circuit 25 receives the signal of the high level from the comparing circuit 14 or 15 or receives an out-of sync signal from a circuit (not shown), the logic circuit 25 controls the latch circuit 9, thereby prohibiting the latching of the output of the latch circuit 8. In this manner, the latch circuit 9 latches the output of the latch circuit 8 when the output of the latch circuit 8 lies within a predetermined reference range and generates the latched value. When the output of the latch circuit 8 is out of the reference range, the latch circuit 9 generates the previously-latched value as it is. The digital tracking error signal generated from the latch circuit 9 is supplied to a D/A converting circuit 24 and is converted to an analog signal and the analog signal is transmitted.

On-track detecting circuit

The on-track detecting circuit will now be described. The output of the latch circuit 9 is supplied to a detecting circuit 26. The detecting circuit 26 detects an inversion (zero-cross) of the polarity of the tracking error signal and generates a detection signal to a circuit (not shown). When the inversion of the polarity is detected, the detecting circuit 26 generates a timing signal to a latch circuit 10 (or 11). When the next inversion of the polarity is detected, the detecting circuit 26 generates the timing signal to the latch circuit 11 (or 10). The latch circuits 10 and 11, accordingly, alternately latch the output of the latch circuit 6 every inversion of the polarity of the tracking error signal. An adding circuit 23 adds outputs of the latch circuits 10 and 11 and generates the mean value. The mean value is latched by a latch circuit 12 at a predetermined timing. Since the latch circuit 6 latches the level at the timing of the clock pit, the latch circuit 12, consequently, latches the means value obtained in a manner such that a clock level when an information detection point traces just on the track and a clock level when the information detection point traces just between the tracks are added and a resultant value is divided by 2. A comparing circuit 16 compares the output of the latch circuit 6 and an output of the latch circuit 12. When the former output is equal to or larger than the latter one, it is regarded that the information detection point is located on the track, so that an on-track signal is generated.

In such an on-track detecting circuit, however, although there is no problem in the case where a carriage holding a pickup for emitting a laser beam moves in the disk radial direction at a very low speed, as the carriage moves at a high speed, the clock pit cannot be always sampled on the track and between the tracks. The number of samples, therefore, decreases and an accurate mean value of the amplitudes of the clock pits cannot be eventually obtained. A case of erroneously recognizing an on-track position consequently occurs.

In such a detecting method, the latch circuits, adding circuits, and the like for detecting the clock pits, sampling a number of amplitude values thereof, and storing those sample values are necessary and the circuit is accordingly complicated, so that it causes an increase in cost.

OBJECTS AND SUMMARY OF THE INVENTION

An object of the invention is to provide an on-track detecting circuit in a tracking servo apparatus which is used for an optical disk apparatus, in which an on-track position can be accurately obtained even in a high speed search and such a circuit can be cheaply realized by a simple construction.

In order to solve the above problems, according to the invention, there is provided an optical disk apparatus for recording and reproducing to/from a disk having wobble pits formed by deviating from the track center in the opposite directions for the disk radial direction by a predetermined track pitch and clock pits formed on the track center, wherein the mean value of amplitude values in two kinds of wobble pit signals obtained from at least the two wobble pits existing in the same servo byte is set to a reference signal, the reference signal is compared with a clock pit signal obtained from the clock pit, and when the clock pit value is larger than the mean value of the two wobble pits, it is determined to be an on-track state.

According to the invention, by comparing the signals obtained from the wobble pits for tracking servo and the clock pit for clock extraction, the on-track detection is achieved.

DETAILED DESCRIPTION OF THE PREFERRED EMBODIMENT

Figure 1:
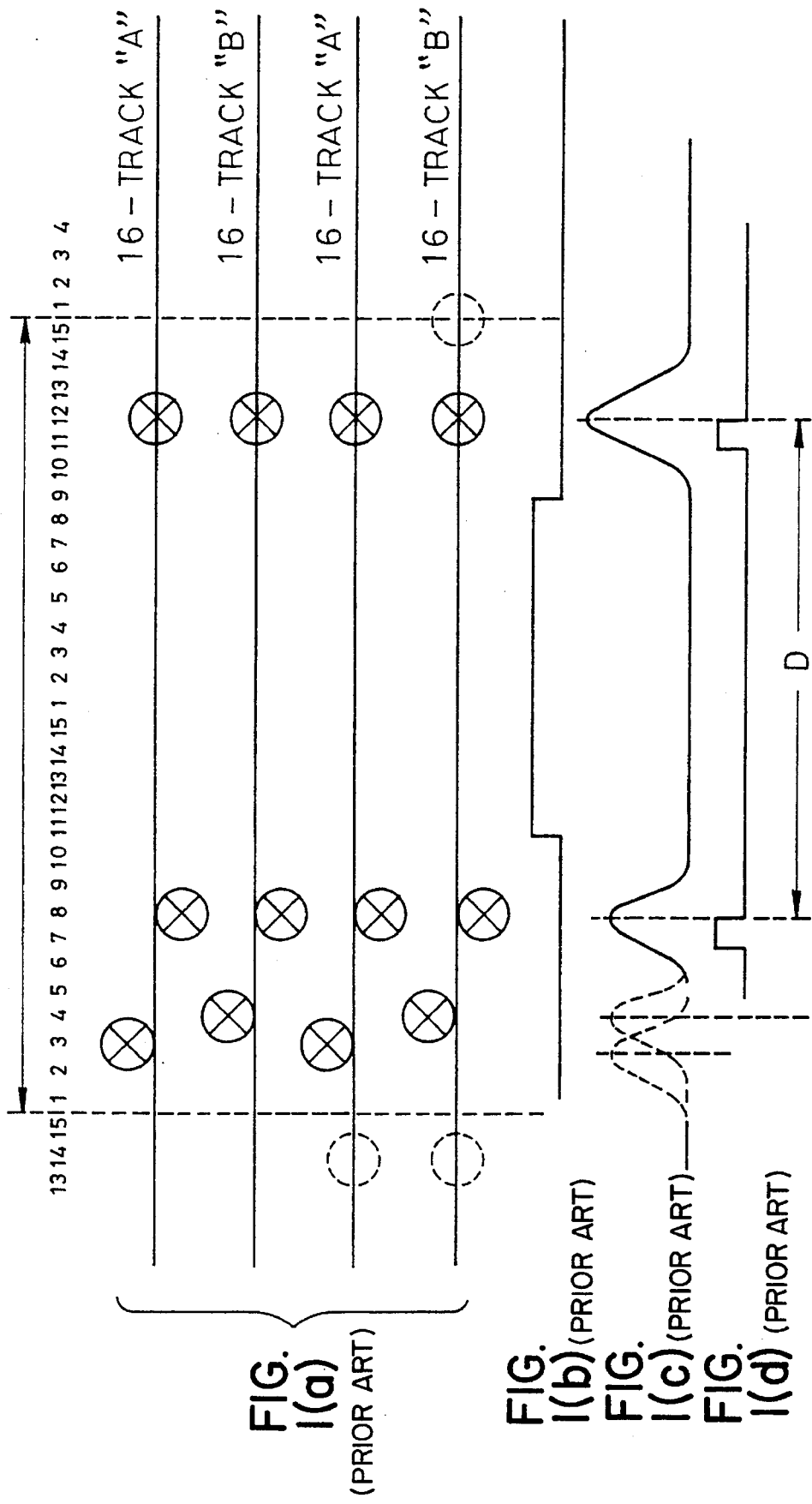
FIG. 1 is a diagram showing servo patterns of a sample servo in a conventional apparatus.
Figure 2:
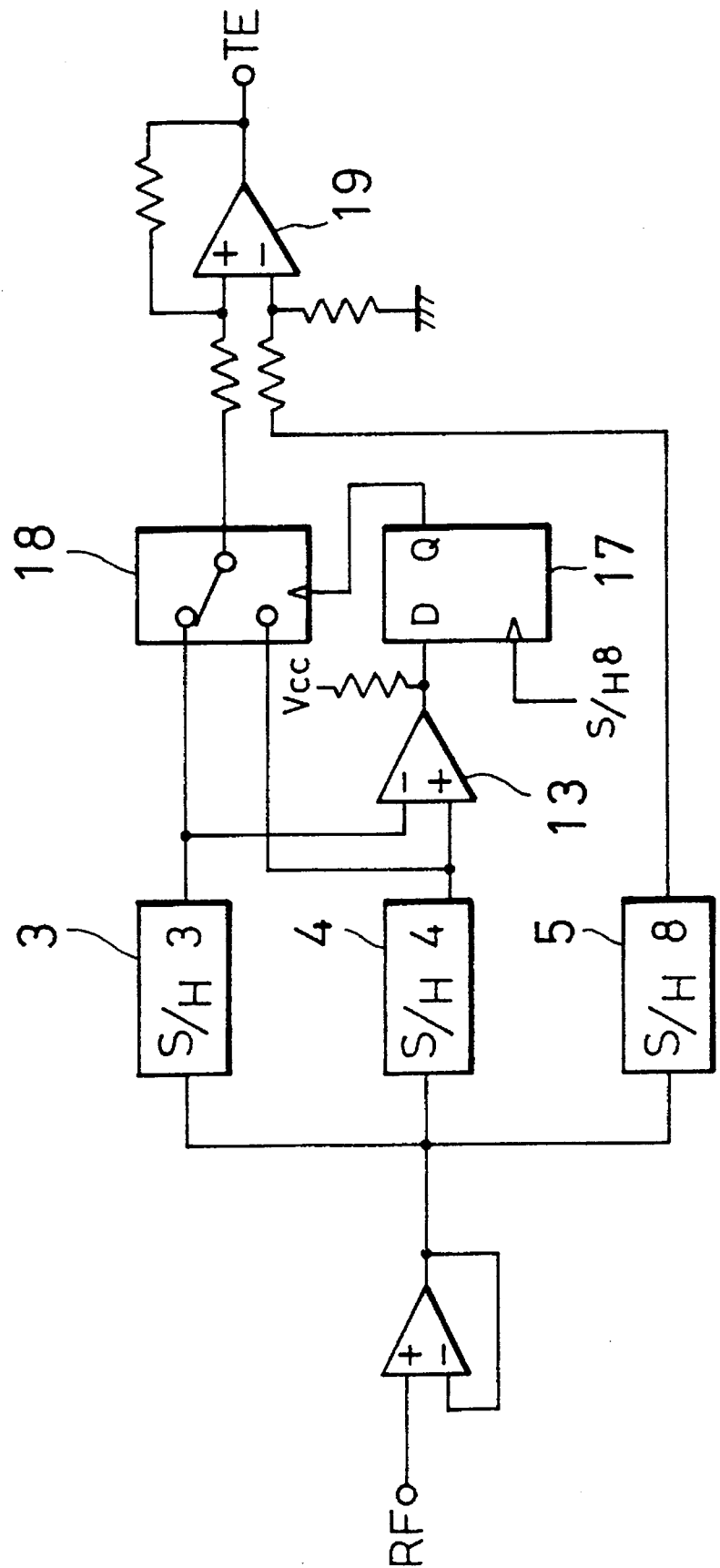
FIG. 2 is a diagram showing a fundamental construction of a tracking servo apparatus in a conventional apparatus.
Figure 3:
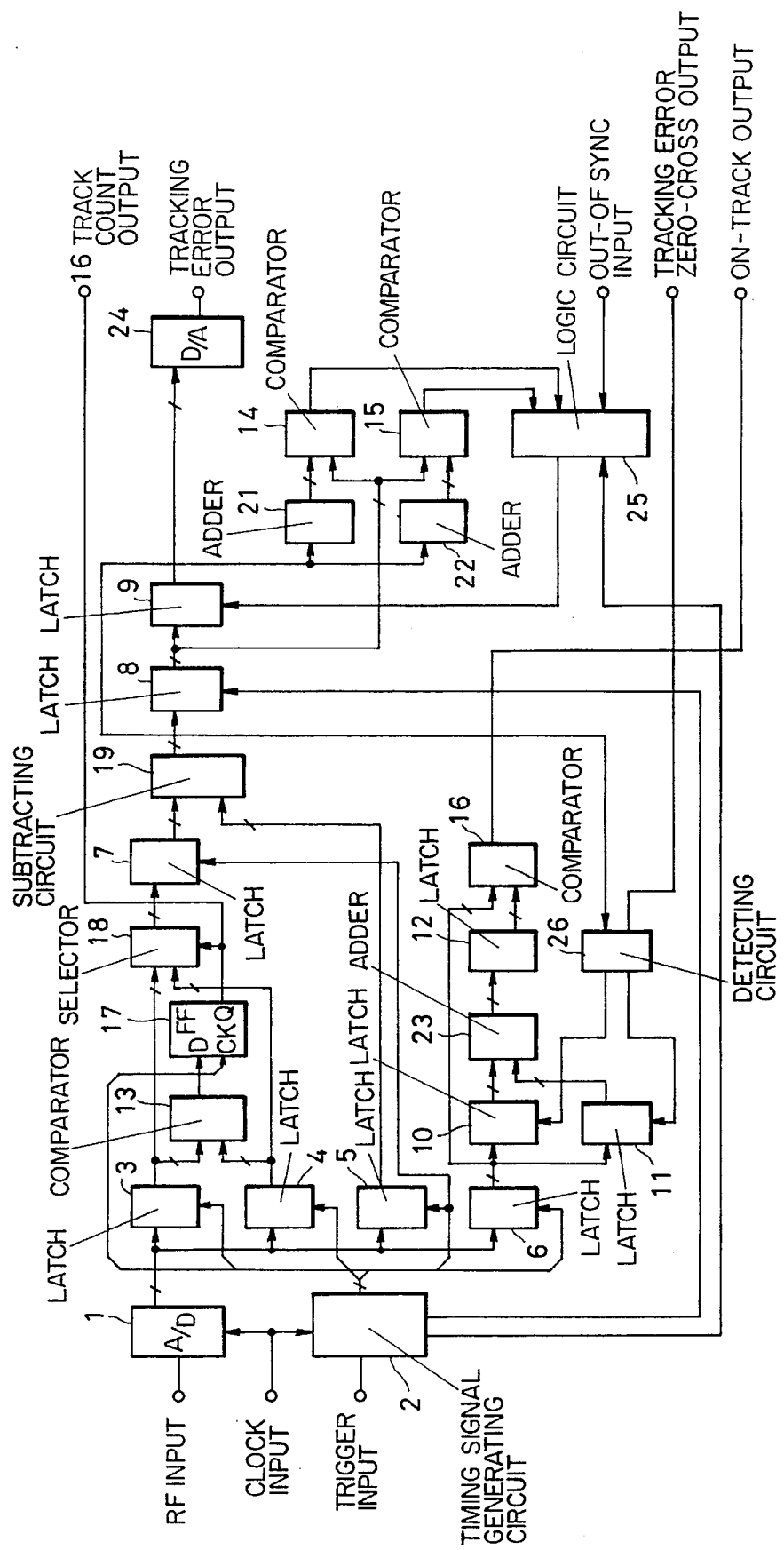
FIG. 3 is a diagram showing a tracking servo apparatus and an on-track detecting circuit in a conventional apparatus.
Figure 4:
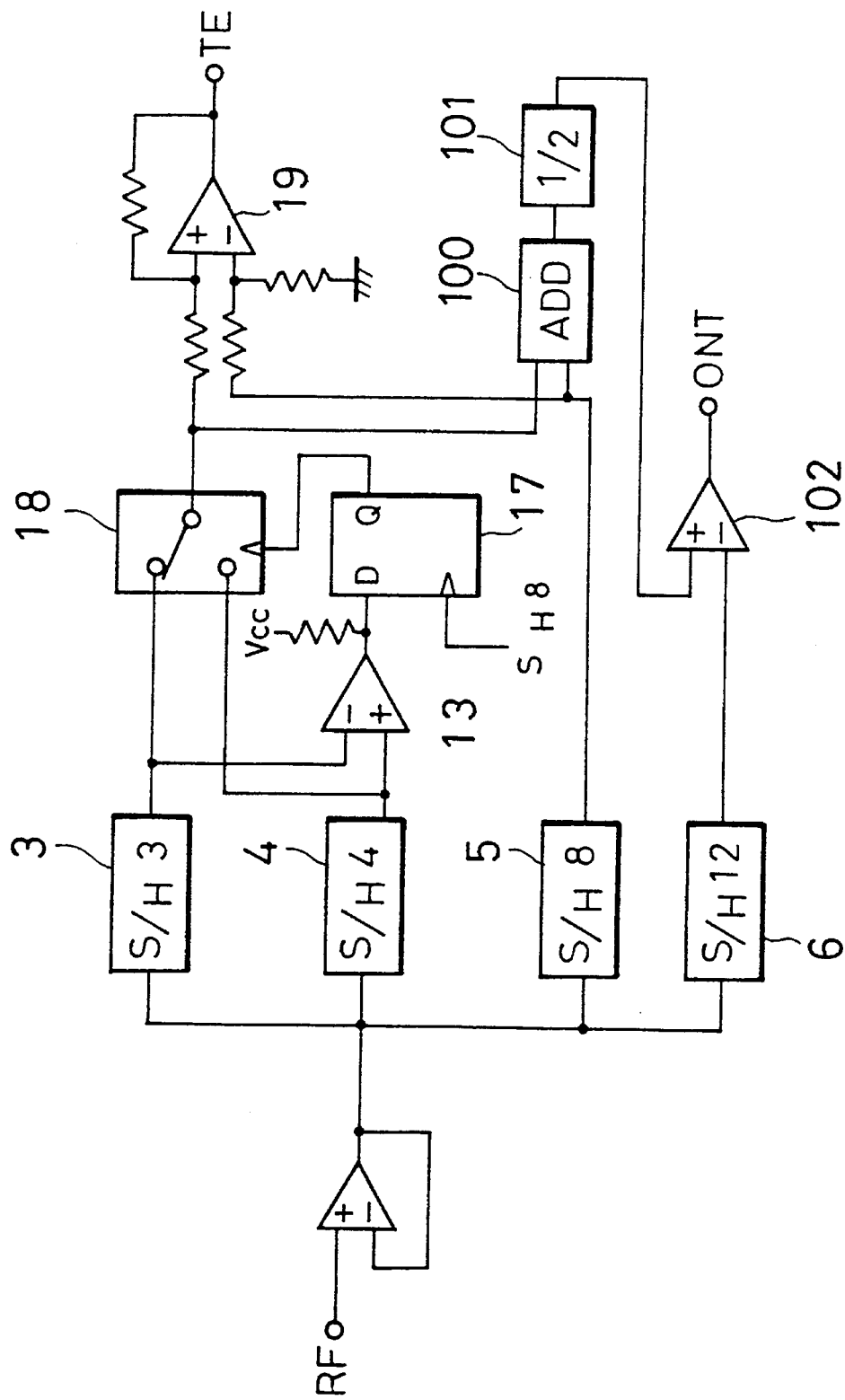
FIG. 4 is a block diagram showing a fundamental construction of the invention.

FIG. 4 is a block diagram showing a fundamental concept of the invention. Component elements similar to those in the conventional apparatus are designated by the same reference numerals. In the diagram, the sample and hold circuits 3, 4, and 5 for sampling and holding the signals of the photodetectors obtained at the timings of the 3-, 4- and 8-channel clocks are provided. In order to discriminate in which one of the 3- and 4-channel clocks the pit exists, outputs of the sample and hold circuits are led to the comparator 13. An output of the comparator 13 is latched by the latch circuit 17 and the output signal in which the pit exists is selected by the selector 18. The signal of the 3- or 4-channel clock and a signal of the sample and hold circuit which sampled and held the 8-channel clock are connected to an adder 100. An output of the adder 100 is connected to a dividing circuit 101 to divide the output into ½. The mean value of the signals of the photodetectors at the timings of the 3-channel (or 4-channel) clock and the 8-channel clock in the same servo byte, namely, the mean value of the amplitudes of the two kinds of wobble pits is obtained. The output of the mean value circuit and an output of a sample and hold circuit 6 which sampled and held the 12-channel clock as a clock pit are connected to a comparator 102 for comparing those outputs. A magnitude of a comparison output of the comparator 102 is judged. When it is large, an on-track signal is obtained.

Figure 5:
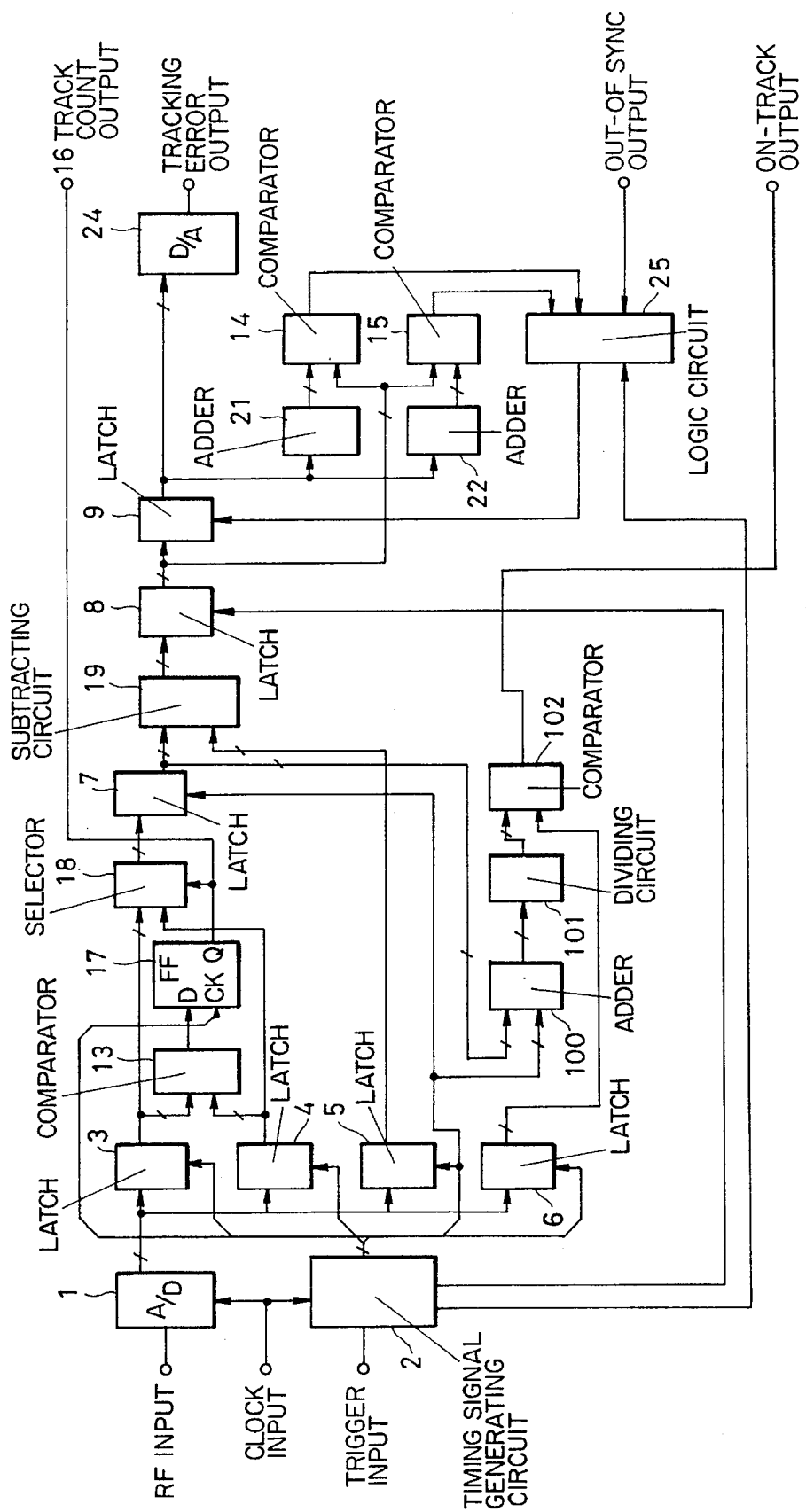
FIG. 5 is a block diagram showing the details of the invention.

The invention will now be described in more detail with reference to FIG. 5.

In the diagram, an RF signal reproduced from an optical disk or the like is supplied to the A/D converting circuit 1 and is A/D converted. Clocks necessary for the A/D converting operation have been supplied to the A/D converting circuit 1. A digital signal generated from the A/D converting circuit 1 is transmitted to the latch circuits 3A to 6A. In this case, the latch circuit is equivalent to the sample and hold circuit shown in FIG. 4. The timing signal generating circuit 2 forms a predetermined timing signal synchronously with a trigger signal and the clock which are received and supplies to circuits and means, respectively. The timing signals corresponding to the third, fourth, and eighth channel bits of the first byte and the twelfth channel bit of the second byte mentioned above have been supplied to the latch circuits 3A to 6A, respectively. The latch circuits 3A to 6A consequently latch the digital signals at the timings of the timing signals.

Outputs of the latch circuits 3A and 4A are supplied to the comparator 13. For example, when the output of the latch circuit 3A is larger than the output of the latch circuit 4A, the comparator 13 generates a signal of the high level. When the output of the latch circuit 3A is smaller than the output of the latch circuit 4A, the comparator 13 generates a signal of the low level. The output signal of the comparator 13 is supplied to a delay flip-flop 17 as a latch circuit and is latched at a predetermined timing. As mentioned above, the first wobble pit is formed in the third or fourth channel bit. The flip-flop 17, therefore, generates the signal of the high level for a period of time of 16 tracks during which the wobble pits are recorded in the third channel bit and the signal of the low level for a period of time of 16 tracks during which the wobble pits are recorded in the fourth channel bit. That is, by monitoring the output of the flip-flop 17, 16 tracks can be counted.

The output of the flip-flop 17 is supplied to the selector 18. The selector 18 selects and generates the output of the latch circuit 3A when the signal of the high level is received and the output of the latch circuit 4A when the signal of the low level is received.

By such operations, the output having the wobble pit in the outputs of the latch circuits 3A and 4A is selected by the selector 18 and is latched by the latch circuit 7. The same timing signal as that of the latch circuit 5A is supplied to the latch circuit 7. In this manner, a difference between the values latched by the latch circuits 5A and 7 is calculated by the subtracting circuit 19. Since the latch circuits 5A and 7 latch the values in the two wobble pits, a digital tracking error signal is eventually formed by the subtracting circuit 19. The digital tracking error signal that is generated by the subtracting circuit 19 is latched by the latch circuit 8 at a predetermined timing.

An output of the latch circuit 7 is connected to one input terminal of the adder 100 and an output of the latch circuit 5A obtained by sampling and holding the output of the 8-channel bit is supplied to the other terminal of the adder 100. An output of the adder 100 is connected to the dividing circuit 101 and, after that, an output of the dividing circuit 101 is connected to the comparator 102. The mean value of the signal of the 3-channel bit (or 4-channel bit) and the signal of the 8-channel bit serving as wobble pits, namely, the mean value of the wobble pits is supplied to one input terminal of the comparator 102. An output of the latch circuit 6A, namely, the clock pit is supplied to the other input terminal of the comparator 102, by which the mean value of the wobble pits and the output of the clock pit are consequently compared. When the output of the clock pit is larger than the mean value of the outputs of the wobble pits, it is decided to be the on-track state and the on-track signal is generated.

Especially, in the invention, since the comparison between the mean value of the two wobble pits which certainly exist in the same byte and the clock pit is performed on the basis of such a mean value, even when the number of sampling times of the clock pit signals is small in the high speed search, the mean value of the wobble pits serving as a comparison reference is constant, so that a sampling error is reduced.

As will be clearly understood from the above description, according to the on-track detecting circuit in the tracking servo apparatus of the invention, there is provided the optical disk apparatus for recording and reproducing to/from the disk having wobble pits formed by deviating from the track center in the opposite directions for the disk radial direction by a predetermined track pitch and clock pits formed on the track center, wherein the mean value of the amplitude values in the two kinds of wobble pit signals obtained from at least the two wobble pits existing in the same servo byte is set to the reference signal, the reference signal is compared with the clock pit signal obtained from the clock pit, and when the clock pit signal value is larger than the mean value of the two wobble pits, it is determined to be the on-track state. The on-track signal, therefore, can be accurately obtained even in the high speed search and the comparators, memories, and the like for sampling the maximum and minimum values in the clock pits and storing and comparing those sample values are unnecessary, so that the on-track detecting circuit can be cheaply realized.

What is claimed is:

1. An on-track detecting circuit in a tracking servo apparatus of an optical disk apparatus for recording or reproducing to/from a disk having wobble pits formed by deviating from a track center in the opposite directions for the disk radial direction by a predetermined track pitch and clock pits formed on the track center, comprising:

sample and hold circuits for sampling and holding outputs from at least the two wobble pits existing in a same servo byte;

an adding circuit for adding outputs of said sample and hold circuits;

a mean value circuit for obtaining a mean value of an output of said adding circuit;

a sample and hold circuit for sampling and holding an output from the clock pit; and a comparator for comparing an output of said mean value circuit and an output of said sample and hold circuit obtained by sampling and holding the output from the clock pit, wherein said comparator generates an on-track signal for setting an on-track state when the output of said sample and hold circuit from the clock pit is larger than the output of said mean value circuit.

2. A circuit according to claim 1, wherein said adding circuit has a selector for selecting and generating either one of a 3- or 4-channel output on the basis of a comparison result of said comparator which judges whether a wobble pit output obtained is of the 3-channel bit or the 4-channel bit, and an output of said selector and an output of an 8-channel bit are added.

3. A circuit according to claim 1, further comprising a comparator for comparing a value of the mean value circuit for averaging the output of said adding circuit and a value of a 12-channel bit as a clock signal and judging an on-track state according to a magnitude of a value of said comparison.

\* \* \* \* \*